United States Patent [19]

Fitzgerald

[11] Patent Number: 6,018,647
[45] Date of Patent: Jan. 25, 2000

[54] DIVERSITY RECEPTION SYSTEM

[75] Inventor: Shane Michael Fitzgerald, Long Beach, Calif.

[73] Assignee: ElectroCom Communication Systems, Inc., Santa Fe Springs, Calif.

[21] Appl. No.: 08/966,623

[22] Filed: Nov. 10, 1997

[51] Int. Cl.[7] ...................................................... H04B 1/00
[52] U.S. Cl. .......................................... 455/135; 455/272
[58] Field of Search .................................... 455/133, 134, 455/135, 226.3, 272, 277.1, 277.2; 375/347, 349

[56] References Cited

U.S. PATENT DOCUMENTS

| | | | |
|---|---|---|---|
| 4,155,041 | 5/1979 | Burns et al. | 455/135 |
| 4,246,655 | 1/1981 | Parker | 455/135 |
| 4,756,023 | 7/1988 | Kojima | 455/133 |
| 5,065,411 | 11/1991 | Muto | 455/133 |
| 5,621,770 | 4/1997 | Zastera | 375/347 |
| 5,710,795 | 1/1998 | Tsumura | 375/346 |

OTHER PUBLICATIONS

Multipath Fading: Causes–Effects–Solutions, paper by Shane Michael Fitzgerald, 1996.
"Mobile Communications Design Fundamentals", William C.Y. Lee, First Edition, p. 31.
"Land Mobile Road System Engineering", Garry C. Hess, p. 323.
"Mobile Communications Design Fundamentals", William C.Y. Lee, First Edition, p. 196.
"Mobile Communications Design Fundamentals", William C.Y. Lee, First Edition, pp. 194–195.
"Land Mobile Radio System Engineering", Garry C. Hess, 1993, pp. 206–207.
"Mobile Communications Design Fundamentals", William C.Y. Lee, First Edition, p. 118.

Primary Examiner—Reinhard J. Eisenzopf
Assistant Examiner—Makoto Aoki
Attorney, Agent, or Firm—Philip G. Meyers; Edward I. Jorgenson; Gardere & Wynne, L.L.P.

[57] ABSTRACT

A diversity reception system for use in narrow-band radio frequency communication systems includes a plurality of receivers that each generate a detected signal from a received radio frequency signal. The diversity reception system switches between receivers to output a high quality audio signal. The system selects a receiver having the highest quality reception at any given time by using a detected signal having the highest relative signal-to-noise ratio when the detected signals have less than a preselected threshold signal-to-noise ratio and a detected signal having the highest relative signal strength when one or more of the receivers is generating a detected signal having a signal-to-noise ratio at or above the preselected threshold signal-to-noise ratio.

20 Claims, 4 Drawing Sheets

DIVERSITY RECEPTION SYSTEM

TECHNICAL FIELD

The present invention relates to narrow-band radio frequency communication systems, and more particularly to diversity reception systems that reduce the damaging effects of multipath fading in mobile communication receivers.

BACKGROUND OF THE INVENTION

Mobile radio communication systems rely upon radio frequency signals to transmit data. The quality of a received signal in such a system depends upon the strength of a carrier signal relative to any noise signal that is introduced during transmission or by the circuitry of the communication system. The relative strength of the received signal is affected by the strength of the transmitted signal and by the distance between the receiver and the transmitter. As the distance increases, received signal strength tends to deteriorate.

In addition, the signal does not usually travel solely along a direct path from the transmitter to the receiver. Although the direct path is one potential propagation path, other possible paths exist. For example, the signal may reflect off of objects that are large with respect to the signal wavelength, such as the side of a building, thereby causing the signal to travel along a reflected path. The signal may be refracted by a knife-edge surface, such as the corner of a building, thereby causing the signal to travel along a refracted path. Finally, an object that is small relative to the wavelength, such as a traffic light, may cause the signal to scatter, thereby causing the signal to travel to the receiver along a scattered path.

Thus, the signal may travel from the transmitter to the receiver along a direct path, a reflected path, a refracted path, a scattered path, or some combination thereof. When the signal travels along multiple paths, each of the multiple coherent signals travels a different distance between the transmitter and receiver. As a result, each signal has a somewhat random phase and amplitude. The phase and amplitude of the overall received signal results from the vector addition of the multiple coherent signals.

In some instances, this combination results in an improvement in the strength of the received signal (constructive interference). In other cases, the received signal strength is degraded (destructive interference) by the multiple path (multipath) propagation.

In the mobile environment, multipath fading occurs as the receiver moves from a zone of constructive interference to a zone of destructive interference. As the vector sum of the multiple coherent signals varies over time, there are significant variations in the strength of the overall carrier signal with respect to the strength of the noise signal. Although these variations may exist when the transmitter-to-receiver distance is static, multipath fading tends to increase with increases in the relative velocity of the transmitter and receiver as the receiver travels between zones of constructive and destructive interference. Because of the significant variations in received signal strength, multipath fading will sometimes cause the strength of the noise signal to instantaneously exceed that of the carrier signal. When this occurs, the received signal may experience a 360 degree phase rotation, which will cause clicks or pops in the received audio signal.

One way to diminish the effects of multipath fading is to employ a diversity reception system. A diversity reception system uses a plurality of receivers and selects between receivers to generate an improved overall signal. The receivers in a diversity reception system are individually coupled to antennas that are spatially separated from one another. When one receiver is experiencing a fade caused by the multipath propagation of the carrier signal, another receiver may have better reception because of the spatial separation of the receivers. By selecting the receiver with the best reception, the overall audio signal produced by the diversity reception system can be improved.

In one type of diversity reception system, the system selects the active receiver according to the RF input signal level of each receiver. Use of receiver RF input signal level as the selection criterion, however, is not always effective because the receiver RF input signal level does not provide an accurate indication of signal quality at low RF input signal levels. A diversity reception system may also rely on the signal-to-noise ratio of the receiver output signals to select the active receiver. Use of the signal-to-noise ratio of the output signal as the selection criterion, however, is also problematic because the signal-to-noise ratio tends to become saturated at high RF signal levels.

Therefore, a diversity reception system is needed that provides for improved receiver selection at both high and low RF signal input levels. The present invention allows for receiver selection at high and low RF input signal levels by selecting the receiver with the highest output signal-to-noise ratio when the receiver is delivering less than a threshold signal-to-noise ratio and selecting the receiver with the highest RF input signal level otherwise.

SUMMARY OF THE INVENTION

The present invention comprises a multi-branch diversity reception system for reducing the damaging effects of multipath fading in a mobile radio environment. Each branch of the system includes a receiver for receiving radio frequency (RF) input signals and for generating a detected audio signal in response to an RF input signal. The system of the present invention also includes a receiver selector that selects between the plurality of receivers. The receiver selector selects the receiver having a detected audio output signal with the highest signal-to-noise ratio when the receivers are delivering less than a maximum achievable signal-to-noise ratio. When the receivers are delivering a detected audio output signal having a signal-to-noise ratio that is at the maximum achievable signal-to-noise ratio, the receiver selector selects the receiver having the highest RF input signal level.

Each receiver includes a Received Signal Strength Indicator (RSSI) that generates a voltage signal indicative of the received signal strength. A diversity selection controller in each branch of the system equalizes the RSSI voltage signal in each branch with respect to the RSSI voltage signals in the other branches of the system to adjust for variations in RSSI and receiver performance. In accordance with the present invention, each diversity reception controller is calibrated for adjusting RSSI voltage signals to accurately indicate the signal-to-noise ratio of the receiver output when the receiver is delivering less than the maximum achievable signal-to-noise ratio. Each diversity reception controller is further calibrated for adjusting RSSI voltages to accurately indicate the RF signal input level when the receiver is delivering the maximum achievable signal-to-noise ratio. Once the diversity reception controllers are calibrated, a receiver selector compares the adjusted RSSI voltages of all receivers to select the receiver with the best reception at any given time.

The receiver selector outputs the detected signal of the selected receiver as determined by the diversity selection process.

In accordance with another feature of the invention, each branch of the diversity reception system includes a detected signal input stage for adjusting the amplitude of the detected audio signals to compensate for variations in detector output levels and to remove any DC bias present. In addition, each receiver in the diversity reception system includes a low noise amplifier for amplifying the received signals. A circuit for disabling the low noise amplifier at high RF input signal levels is also provided. By disabling the low noise amplifier at high RF input signal levels, the system prevents saturation of the RSSI voltages and allows the diversity selection process to continue at higher input signal levels than would otherwise be possible.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

Figure 1A:
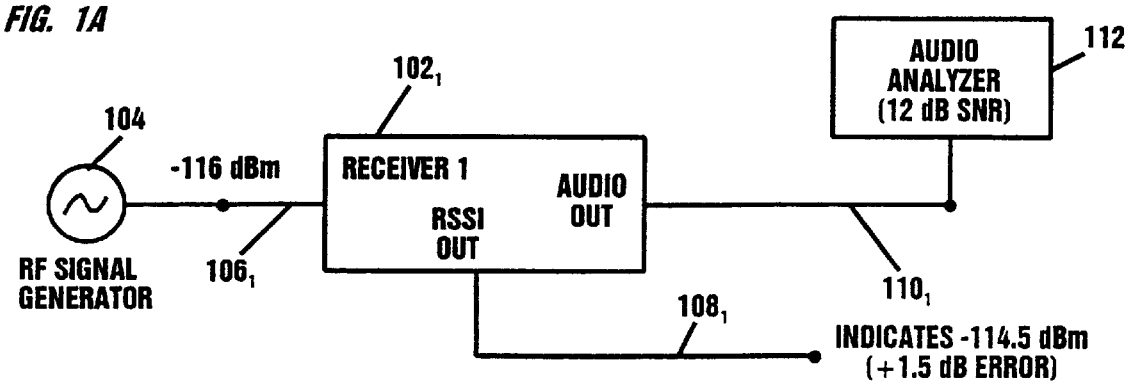
FIG. 1A is a first receiver testing circuit for illustrating the effects of RSSI circuitry on receiver selection when using RSSI voltages as the selection criterion.

Reference is now made to the Drawings wherein like reference characters denote like or similar parts throughout the various Figures. The diversity reception system of the present invention functions as a post-detection system by receiving transmitted signals that have already been detected by a discriminator or demodulator. The system has utility in many narrow band radio systems and has application in both voice and data communication systems.

A diversity reception system selects between multiple receivers to generate a higher quality audio signal than can be generated by a system having a single receiver. The quality of the audio signal generated by a diversity reception system depends upon the ability of the system to select the receiver with the best signal reception at any given time. The improvement in the overall audio signal output produced by a diversity reception system is referred to as the diversity improvement factor. A diversity reception system avoids the "click" noise phenomenon caused by multipath fading by changing between receivers to produce an overall audio output signal that does not include the deep signal fades that occur in single receiver systems.

At low RF signal input levels, the quality of reception by a receiver at a particular instant is determined by the signal-to-noise ratio of the receiver output signal. Generally, the signal-to-noise ratio of a receiver output signal increases with input signal strength. At some level, however, a receiver reaches a maximum achievable signal-to-noise ratio, and further increases in the RF input signal level cease to have any noticeable effect on the signal-to-noise ratio of the receiver output signal.

One type of diversity reception system measures the signal-to-noise ratio of output signals of the system receivers to select among the multiple receivers. A diversity reception system that uses only the measured signal-to-noise ratio as the selection criterion will cease to function properly in areas where the RF input signal level is at or above the level required to produce the maximum signal-to-noise ratio. Because the signal-to-noise ratio stops changing once the maximum level is reached, receiver selection in the diversity reception system is not changing either. This type of system is prone to the high-level "click" noise phenomenon that results from multipath fading.

Another type of diversity reception system uses a Received Signal Strength Indicator (RSSI) to measure the RF input signal strength of each receiver. At relatively high RF signal levels, the strength of the received signal provides a fairly accurate indication of the quality of the received signal. The RSSI generates a voltage that is proportional to the input signal strength. A diversity system controller selects the receiver with the highest RSSI voltage, and the system outputs the audio signal from the selected receiver.

Figure 1B:
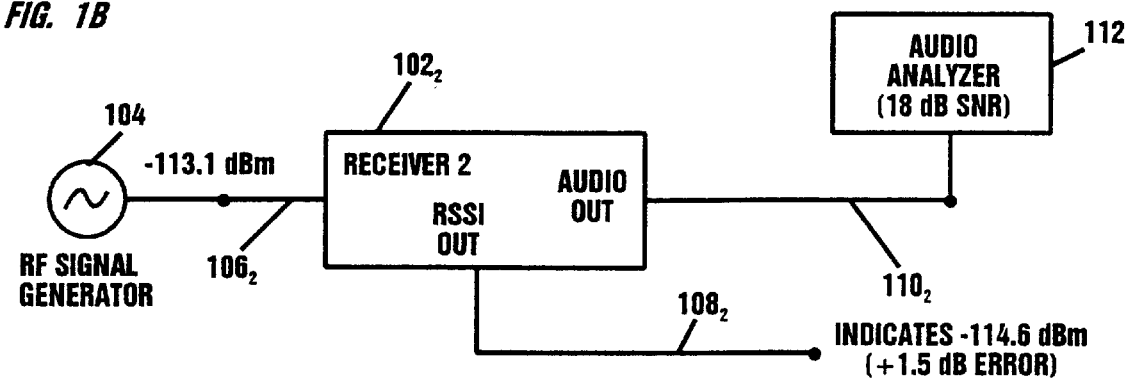
FIG. 1B is a second receiver testing circuit for illustrating the effects of RSSI circuitry on receiver selection when using RSSI voltages as the selection criterion.

A diversity reception system that uses the RSSI voltage as the sole selection criterion exhibits two operational flaws that act to reduce the effectiveness of the system. The first flaw stems from a lack of accuracy in the quantification of a receiver's RF input signal level. The highest quality RSSI circuitry available will indicate received signal strengths with a +/−1.5 dB accuracy over the RSSI's linear range. RSSI performance is linear from approximately −124 dB to about −30 dB. The RSSI's accuracy further degenerates at both extremes of the RSSI's range. Referring to FIGS. 1A and 1B, there is illustrated how a +/−1.5 dB inaccuracy in the RSSI voltage affects the process of selecting between receivers 102. Two assumptions are made for purposes of this illustration. First, the output signal-to-noise ratio of the receivers 102 is assumed to be identical when the RF input signal level for each of the two receivers 102 is the same; normally, receivers do not have such identical performance. Second, the RSSI's accuracy is assumed to be +/−1.5 dB. At the lower extreme of the RSSI's range, however, an RSSI is not normally this accurate. These two assumptions are made for ease of explanation; in an actual application, reliance on RSSI voltage as the selection criterion is more problematic than this illustration indicates.

The performance of two receivers 102 is measured by connecting an RF signal generator 104 to an input terminal 106 of each receiver 102 and an audio analyzer 112 to an audio output terminal 110 of each receiver. The RF signal generator 104 outputs a controlled input signal, and the audio analyzer 112 measures the signal-to-noise ratio (SNR) of the audio signal output from each receiver 102. The receivers 102 also include an RSSI output terminal 108. An RSSI circuit contained within each receiver 102 outputs a voltage proportional to the received signal strength.

In this example, the RF signal generator 104 connected to a first receiver $102_1$ transmits a signal with a level of −116.0 decibels above 1 milliwatt (dBm) to the first receiver $102_1$. With this input signal level, the first receiver $102_1$ produces an audio output signal with a 12.0 dB signal-to-noise ratio, as measured by the audio analyzer 112. The RSSI output on the line 108 of the first receiver $102_1$ indicates that the input signal has a level of −114.5 dBm. Thus, the RSSI output has a +1.5 dB error. Another signal generator 104 connected to a second receiver $102_2$ transmits a signal with a level of −113.1 dBm to the second receiver $102_2$. In this case, the audio analyzer 112 indicates that the audio output signal from the second receiver $102_2$ has an 18.0 dB SNR. The higher SNR generated by the second receiver $102_2$ as compared to the first receiver $102_1$ results from the higher input signal level transmitted to the second receiver $102_2$. The RSSI voltage of the second receiver $102_2$, however, indicates a signal level of −114.6 dBm. Thus, the RSSI voltage output for the second receiver $102_2$ has a −1.5 dB error. If the active receiver 102 in a diversity reception system is selected based upon RSSI voltage, the first receiver $102_1$ would be selected because it has a higher RSSI voltage. Selecting the first receiver $102_1$, however, is inappropriate because the second receiver $102_2$ has a higher signal quality as indicated by the higher signal-to-noise ratio reading on the audio analyzer 112. Use of the RSSI voltage in this example, therefore, would result in inefficient receiver selection.

A second operational flaw caused by using the RSSI voltage as the selection criterion stems from a lack of correlation between a receiver's RF input signal level and the signal-to-noise ratio of the receiver's output. Receiver performance varies from receiver to receiver even when the receivers 102 have an identical design. One receiver 102 may generate an audio output signal with a high signal-to-noise ratio at a lower relative input signal level than another receiver 102. If received signal strength, as indicated by the RSSI voltage, is the criterion for selecting a particular receiver 102 and the receivers do not have identical performance regarding the relationship between receiver RF input signal level and receiver output signal-to-noise ratio, then the improvement in the overall audio signal will be reduced from a system that uses output signal-to-noise ratio as the selection criterion.

Figure 2A:
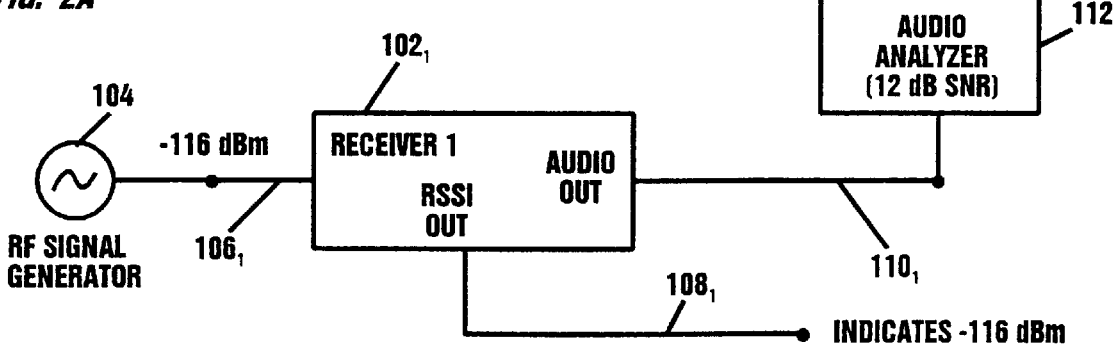
FIG. 2A is a first receiver testing circuit for illustrating the effects of variations in receiver signal-to-noise ratio performance on receiver selection when using RSSI voltages as the selection criterion.
Figure 2B:
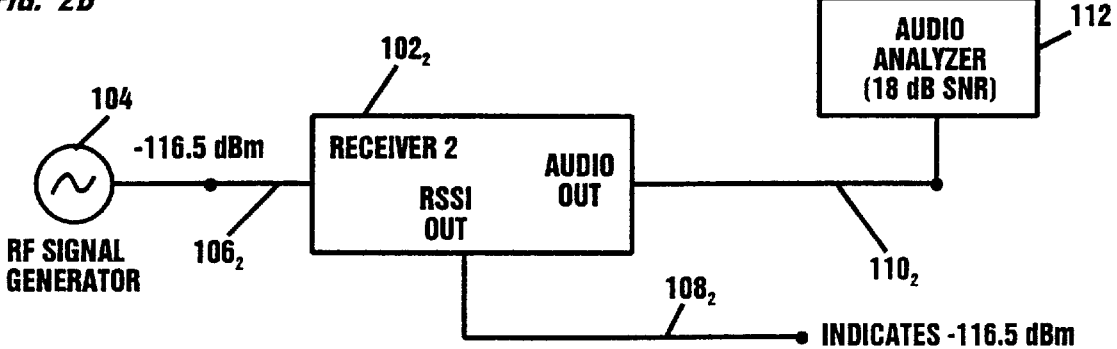
FIG. 2B is a second receiver testing circuit for illustrating the effects of variations in receiver signal-to-noise ratio performance on receiver selection when using RSSI voltages as the selection criterion.

Referring to FIGS. 2A and 2B, there is illustrated how variations in receiver performance between different receivers 102 reduces the diversity improvement factor. In this illustration the RSSI voltages are assumed to be accurate. As discussed in connection with FIGS. 1A and 1B, however, RSSI voltages normally have no more than a +/−1.5 dB degree of accuracy.

In this example, an RF signal generator 104 transmits a signal with a level of −116.0 dBm to the first receiver $102_1$. The RSSI voltage output on line $108_1$ accurately indicates that the received signal has a level of −116.0 dBm. The first receiver $102_1$ produces an audio output signal with a 12.0 dB signal-to-noise ratio with the −116.0 dBm input signal level. An RF signal generator 104 coupled to the input $106_2$ of a second receiver $102_2$ transmits a signal with a level of −116.5 dBm. The RSSI voltage output on line $108_2$ accurately indicates an input level of −116.5 dBm. In this example, the second receiver $102_2$ has a higher efficiency than the first receiver $102_1$ and produces an audio output signal with a 18.0 dB signal-to-noise ratio corresponding to the −116.5 dBm input level. If a diversity reception system selects receivers based upon the RSSI voltage, the first receiver $102_1$ would be selected because it has a higher input signal strength. Selecting the first receiver $102_1$ is inappropriate in this case because the second receiver $102_2$ generates an audio output signal having a higher signal-to-noise ratio. Use of the RSSI voltage in this example, therefore, would result in inefficient receiver selection.

Figure 3:
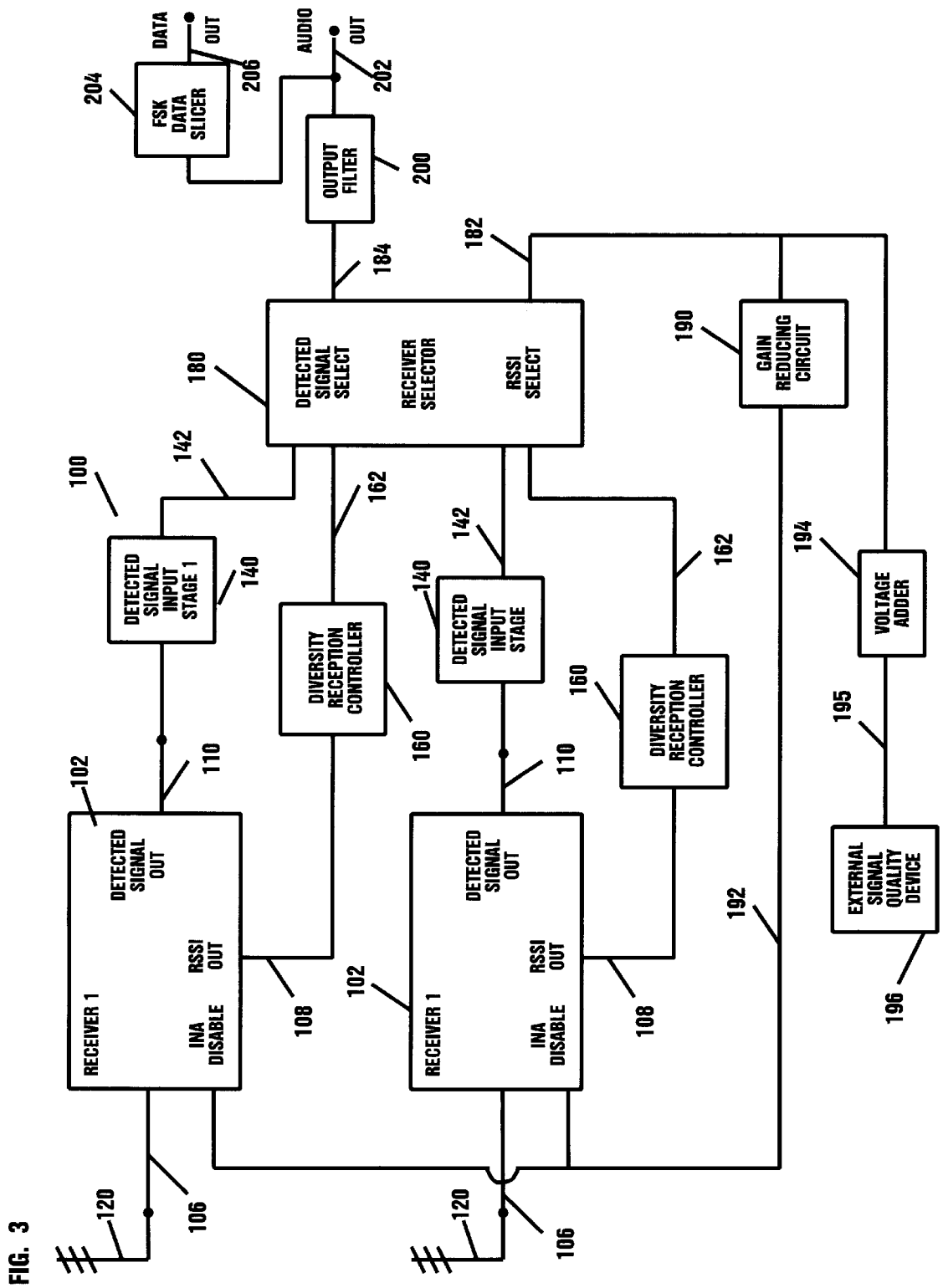
FIG. 3 is a diversity reception system in accordance with the present invention.

Referring now to FIG. 3, there is illustrated a block diagram of a two-branch diversity reception system 100. The diversity reception system 100 selects from the receivers 102 in the two branches by transmitting an audio output on line 110 of a receiver 102 having the highest signal-to-noise ratio when the receivers 102 are generating output signals having less than the maximum achievable signal-to-noise ratio, and by transmitting the output of a receiver 102 with the highest RF input signal level when the receivers 102 are generating the maximum achievable signal-to-noise ratio. The selection of the active receiver 102 based on receiver signal-to-noise ratio as the selection criterion at low RF input levels and on the RF input signal strength of the receivers 102 as the selection criterion at high RF input levels enables the system to generate the best possible overall output signal.

The diversity reception system 100 includes two branches each having an antenna 120, a receiver 102, a detected signal input stage 140, and a diversity reception controller 160. An RF input signal is received by the antenna 120 and transmitted to the receiver 102 through an input signal terminal 106. The receiver 102 includes a detected signal terminal 110 and an RSSI output line 108. The detected signal terminal 110 is coupled to a detected signal input stage 140. The detected signal input stage 140 buffers the detected signals from the receiver 102 and provides a means to adjust the amplitude of the signals to compensate for variations in detector output levels by equalizing the detected signal levels. The equalization of the detected signals minimizes any transients that would be caused by switching between receivers 102 that generate detected signals having unequal levels. In addition, the detected signals may include a DC bias that differs between receivers 102. The detected signal input stage 140 high-pass filters the signals to remove any DC bias present. The RSSI output line 108 connects to a diversity reception controller 160 that adjusts the RSSI voltage to compensate for differences in RSSI performance between the receivers 102.

A receiver selector 180 selects an active receiver 102 by comparing the different diversity reception controller output signals transmitted along lines 162. The receiver selector 180 also receives the adjusted audio output from each receiver 102 along lines 142. To select the receiver 102 having the highest quality reception, the receiver selector 180 outputs the adjusted RSSI voltage of the selected receiver 102 on an RSSI line 182 and outputs the audio signal of the selected receiver 102 on an audio line 184. Audio line 184 is coupled to an output filter 200 for removing any high speed transients that may be induced by high-speed switching between receivers 102. The output filter 200 generates a diversity system audio output on an audio output line 202. A frequency-shift keying (FSK) data slicer 204 is coupled to the audio output line 202. The frequency-shift keying data slicer 204 generates diversity system data outputs at a data output terminal 206 by decoding data messages that may be encoded in the audio signal.

The diversity reception system 100 also includes a gain reducing circuit 190 that responds to the adjusted RSSI output voltage of the selected receiver 102 to control the operation of amplifiers included in each receiver 102. By disabling the amplifiers in the receivers 102 at high RF input signal levels, the gain reducing circuit 190 enables the diversity selection process to continue at higher input levels than would otherwise be possible.

Increasing the number of branches in the system 100 increases the diversity improvement factor of the system if the antennas 120 are placed in an efficient configuration. The antenna spacing required for efficient system operation is primarily a function of the wavelength of the transmitted signals.

The degree of overall correlation between receivers 102 is reduced by increasing the number of receivers 102. The incremental improvement that results from adding receivers, however, decreases with each additional receiver. For example, the addition of a third receiver provides a greater increase in the diversity improvement factor than the further addition of a fourth receiver; the addition of a fourth receiver provides a greater increase in the diversity improvement factor than the further addition of a fifth receiver; and so on. In one preferred embodiment, the diversity reception system 100 includes three receivers 102. Each receiver 102 is individually coupled to a respective antenna 120. By placing each antenna 120 at a corner of an imaginary equilateral triangle, there is a low likelihood of correlation between the three received signals if a properly sized triangle is used. Thus, use of a triple antenna configuration reduces the occurrence of fading to a greater extent than does a two-branch diversity reception system.

Figure 4:
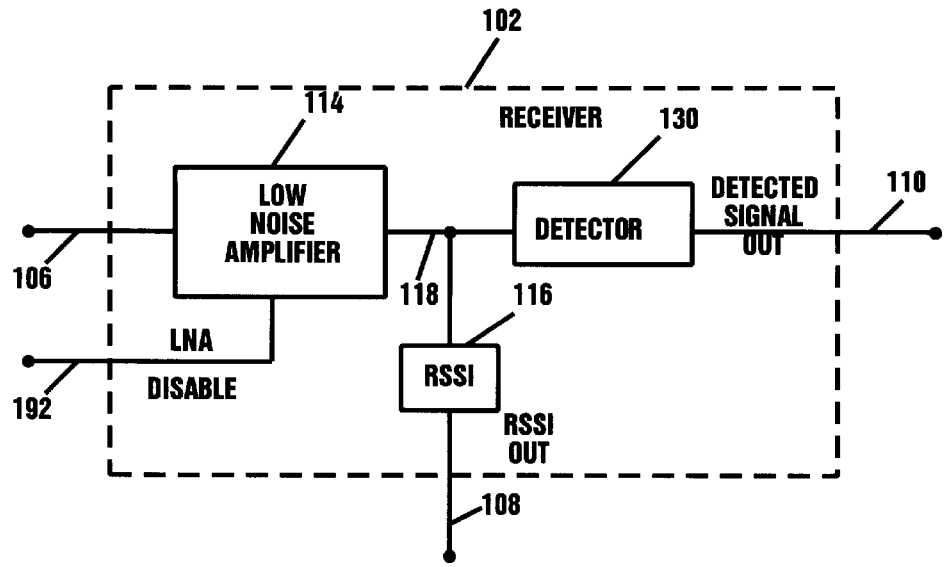
FIG. 4 is a block diagram of a receiver in accordance with the present invention.

Referring now to FIG. 4, there is illustrated a more detailed block diagram of a receiver 102 in the diversity reception system 100. The receiver 102 includes a low noise amplifier 114 for amplifying the RF input signals. The low noise amplifier 114 produces approximately 15 dB of gain in the receiver 102. The amplified signal is output along line 118 and is detected by a detector 130. The detector 130 includes a demodulator and/or a discriminator for generating an RF detected signal from the signal received by the antenna 120. The detected signal is output at an audio output terminal 110. The receiver 102 also includes an LNA DISABLE line 192 for receiving signals from the gain reducing circuit 190 (FIG. 3). A logic high output from the gain reducing circuit 190 disables the amplifier 114 and interrupts the 15 dB gain of the amplifier. When the low noise amplifier 114 is disabled, the amplifier generates approximately 7 dB of loss in the RF signal, thereby reducing the audio output by a total amount of about 22 dB. A Received Signal Strength Indicator 116 (RSSI) measures the signal strength of the signal produced along line 118 from the amplifier 114 and outputs a voltage indicative of the signal strength at an RSSI output port 108.

Figure 5:
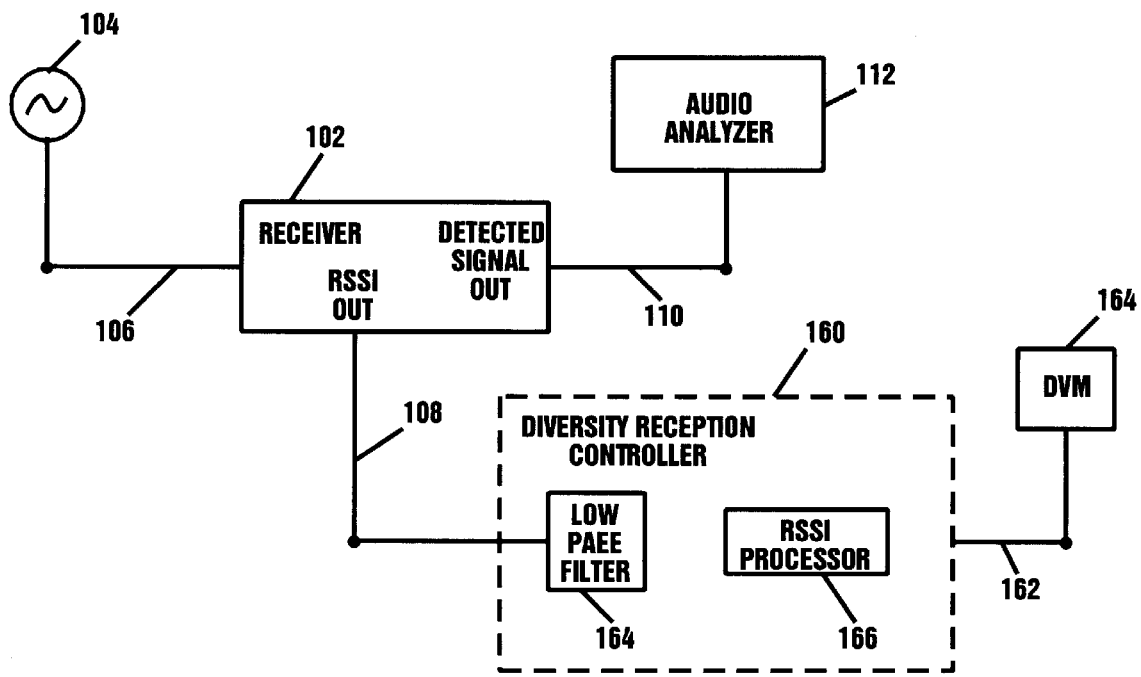
FIG. 5 is a block diagram of a circuit for calibrating a diversity reception controller in accordance with the present invention.

Referring now to FIG. 5, there is illustrated a circuit for calibrating a diversity reception controller 160 in a diversity reception system 100. The diversity reception controller 160 includes a low pass filter 164 coupled to the RSSI output line 108. The filter output is coupled to an RSSI processor 166. The low-pass filter 140 removes any high frequency components of the RSSI voltage signals while preserving the lower-frequency amplitude fluctuations produced by relative motion-induced multipath fading. Although the low-pass filter 140 improves the response of the receiver selection system in general, the filter is particularly useful for improving system response at low RF input levels.

The RSSI processor 166 contains level adjusting circuitry that enables tuning of the processor output level with respect to the level of the RSSI voltage signal generated by the receiver 102. Each RSSI processor 166 in the diversity reception system 100 is individually calibrated to produce a voltage indicative of the signal-to-noise ratio when the receiver 102 is generating audio output signals having less than a selected threshold signal-to-noise ratio. Further calibration of the RSSI processor 166 also enables the RSSI processor to produce a signal indicative of the RF input signal level once the audio output signal of the receiver reaches the selected threshold signal-to-noise ratio. In the preferred embodiment, a signal-to-noise ratio value that is at or near the maximum achievable signal-to-noise ratio is selected as the threshold signal-to-noise ratio.

The calibration procedure is performed before the receiver 102 is installed in the diversity reception system 100. In the calibration procedure, an RF signal generator 104 is coupled to the input signal line 106 of the receiver 102 for generating controlled RF input signals. An audio analyzer 112 is coupled to the audio output line 110 for measuring the signal-to-noise ratio of the audio signal from the receiver 102, and a digital voltage meter (DVM) 164 is coupled to the output of RSSI processor 166 for measuring the processed, low-pass filtered RSSI voltage signal.

The signal generator 104 is first adjusted to generate a receiver input signal having sufficient amplitude to produce a first specified signal-to-noise ratio (normally 12.0 dB) as measured by the audio analyzer 112. The level adjusting circuitry in the RSSI processor 166 is then tuned to output a preselected voltage, as measured by the DVM 164, representative of the first specified signal-to-noise ratio.

The calibration process continues by increasing the signal generator 104 output until the receiver 102 produces an audio output signal with a second signal-to-noise ratio (22.0 dB, for instance). The level adjusting circuitry in the RSSI processor 166 is adjusted to further tune the processor output to produce a second preselected voltage, as measured by the DVM 164. The second preselected voltage is representative of the second signal-to-noise ratio. The calibration process is repeated at a plurality of different signal-to-noise ratio values until the maximum signal-to-noise ratio (typically around 40 dB) is reached. At this point, further increasing of the signal generator's output will have no effect on the signal-to-noise ratio of the recovered signal. By repeating the calibration process at a plurality of different signal generator 104 levels for each of the receivers 102, differences in the performance of each receiver 102 can effectively be removed by properly adjusting the level adjusting circuitry of each RSSI processor 166. This equalization of receiver performance permits the receiver selector 180 to compare the RSSI processor outputs to accurately determine which receiver 102 is producing the best signal-to-noise ratio when operating at less than the maximum achievable signal-to-noise ratio.

Once the RSSI processor 166 is calibrated across the dynamic range of signal-to-noise ratios, the calibration procedure is continued by further increasing the signal generator output for the receiver 102 above the level required to produce the maximum achievable signal-to-noise ratio. In the preferred embodiment, the level of the RF signal input to the receiver 102 is increased by 50 dB. The level adjusting circuitry is tuned to output a voltage representative of this higher input signal level. By following this procedure for each RSSI processor 166, the RSSI output of each receiver 102 is calibrated to allow for accurate comparisons between the RSSI voltages. Once the RSSI processors 166 are fully calibrated, the diversity reception system 100 is set to select the receiver 102 producing the highest signal-to-noise ratio when operating below the maximum achievable signal-to-noise ratio and adjusted to select the receiver 102 having the highest RF signal level otherwise.

With some receivers 102 it may be possible to use an abbreviated calibration procedure in which the receivers are calibrated at just two receiver RF input signal levels. In an abbreviated calibration procedure, the signal generator 104 is first adjusted to generate an input signal that produces an audio signal having less than the maximum achievable signal-to-noise ratio. The level adjusting circuitry is calibrated to output a specified voltage at the selected signal-to-noise ratio. The signal generator 104 is then adjusted to produce a second RF signal input level that is above the level necessary to produce the maximum achievable signal-to-noise ratio, and the level adjusting circuitry is calibrated to output a higher specified voltage for the second specific input level.

Using either the full or the abbreviated calibration procedure in each branch of the diversity reception system permits efficient selection among receivers by effectively removing the effects of measurement inaccuracies in RSSI circuitry. The calibration procedure also adjusts for differences among receivers in the degree of correlation between receiver RF input signal levels and receiver output signal-to-noise ratios. Thus, the diversity reception system of the present invention represents an improvement over systems that solely rely on RSSI voltages as the selection criterion. In addition, unlike systems that use only the signal-to-noise ratio as the selection criterion, the calibration procedure described above also allows for diversity selection to continue even after a receiver reaches its maximum achievable signal-to-noise ratio.

Figure 6:
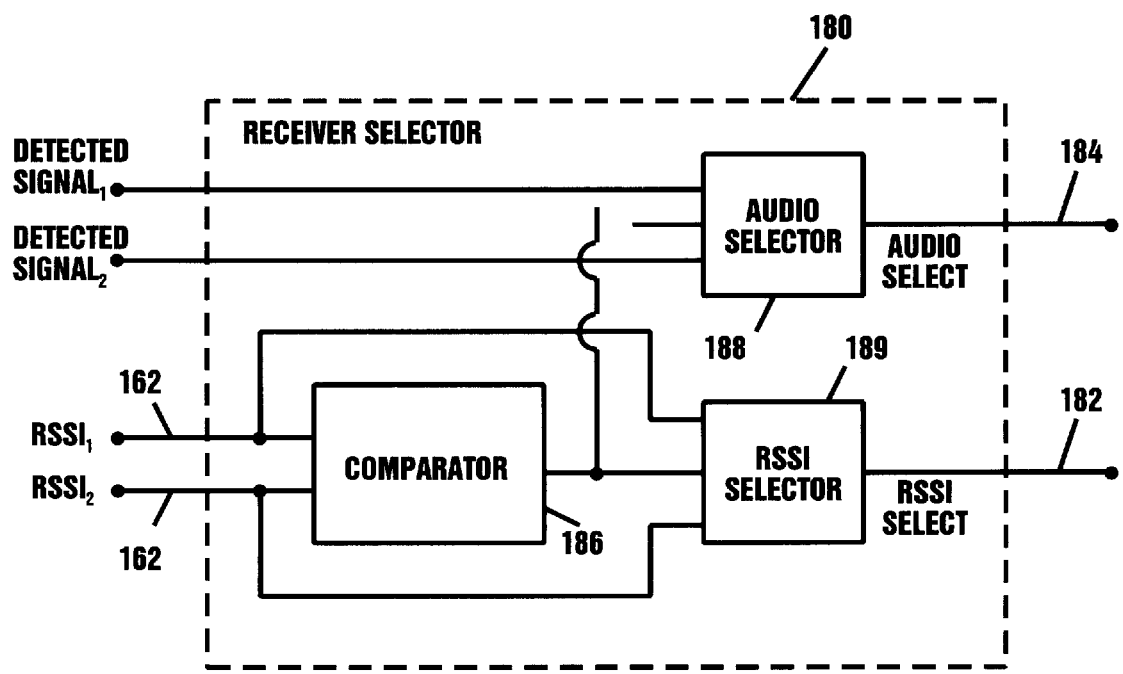
FIG. 6 is a block diagram of a receiver selector in accordance with the present invention.

Referring now to FIG. 6, there is shown a block diagram of the receiver selector 180. The receiver selector 180 includes a comparator 186 for comparing the adjusted RSSI voltages that are output from the RSSI processors 166 in the various branches of the diversity reception system 100. The comparator 186 generates a signal indicating the branch of the system having the highest adjusted RSSI voltage level at any given time. The comparator signal output is coupled to an RSSI selector 189 and an audio selector 188. In response to the comparator signal output, the RSSI selector 189 outputs the RSSI voltage (RSSI SELECT) of the selected receiver 102, and the audio selector 188 outputs the audio signal output (AUDIO SELECT) of the selected receiver 102. Thus, the receiver selector 180 outputs only the signals from the receiver 102 that has the highest quality audio output at any given time.

The receiver selector 180 shown is FIG. 6 includes two branches. As discussed above, a diversity reception system 100 may include additional branches for increasing the diversity improvement factor. The receiver selector 180 in such a system 100 may select among three or more branches by using a comparator 186 that compares the three or more RSSI voltages. The RSSI selector 189 and the audio selector 188 select among the RSSI and audio signals from the three or more branches in response to the comparator output.

In another embodiment, the receiver selector 180 includes additional comparator/selector stages identical to the single stage shown in FIG. 6. For example, in a three-branch system, a second-stage comparator 186 compares the RSSI output from the first comparator/selector stage with the adjusted RSSI output from a third branch of the system 100. The RSSI selector 189 and the audio selector 188 in the second stage then output the RSSI and audio signals from the selected receiver 102 in accordance with the second-stage comparator output signal.

Referring again to FIG. 3, the diversity reception system includes a gain reducing circuit for controlling the operation of the low noise amplifier 114 (shown in FIG. 4) in each receiver 102. RSSI voltages tend to become saturated at relatively high RF input levels. Once the RF input reaches a certain level, the RSSI 116 in the receiver 102 is limited and will not generate voltage outputs that are proportional to further increases in the RF input level. When the RSSI voltage becomes saturated, the RSSI processor 166 will not produce a voltage output that accurately indicates the high quality of the RF input signal. The damaging effects of multipath fading occur, however, even at high RF signal levels. To alleviate this situation, the diversity reception system 100 includes gain reducing circuitry 190 that reduces the signal gain introduced by the low-noise amplifier 114 in the receiver 102.

The gain reducing circuit 190 detects the level of the RSSI signal received from the receiver selector 180 along line 182. Upon detecting an RSSI signal of sufficient amplitude, the gain reducing circuit 190 produces a logic level output (LNA DISABLE). This logic level output turns off the low-noise amplifiers 114 in the receivers 102. Disabling the low-noise amplifier 114 reduces the RF input to the receiver 102 by about 22 dB, essentially adding another 22 dB of dynamic range at the upper end of the signal strength range. Normally, the receiver selection process would not continue when the RSSI becomes saturated because the RSSI voltages are not changing. If the RSSI voltages are not changing, the selected receiver 102 will not change either. By reducing the gain introduced in the receiver 102, the gain reducing circuitry 190 allows the diversity selection process to continue at higher signal levels and ensures that diversity improvement will extend into areas with even the highest signal levels.

The diversity reception system 100 also supplies a voltage proportional to signal quality, as generated by the diversity selection process, to an external signal quality device 196. The external device 196 displays an indication of signal strength to a user of the communication system. Turning off the low-noise amplifiers 114 in response to an LNA DISABLE signal, however, produces an abrupt change in the RSSI voltage generated by the receivers 102. This abrupt change causes a discontinuity in the signal quality voltage and will result in an inaccurate reading of the signal quality by the external signal quality device 196. To avoid the discontinuity in the signal quality voltage, the diversity reception system 100 includes a voltage adder 194. The voltage adder 194 responds to the LNA DISABLE signal by adding to the signal quality voltage a voltage equal in magnitude to the abrupt change in the RSSI voltage. Thus, the voltage adder 194 minimizes the discontinuity in the voltage supplied to the external signal quality device 196 allowing the device 196 to indicate a high signal quality even when the internal gain of the system is reduced.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

I claim:

1. A diversity reception system for signal reception, comprising:
    a plurality of receivers, each receiver generating a detected signal from a received radio frequency signal;
    and a receiver selector coupled to each of the plurality of receivers to select a receiver and output the detected signal of the selected receiver, said receive selector including an audio selector for selecting the receiver from the plurality of receivers generating the detected signal having the highest relative signal-to-noise ratio when the detected signal from each of the receivers has a signal-to-noise ratio below a selected threshold signal-to-noise ratio corresponding to the maximum achievable signal-to-noise ratio, and for selecting the receiver from the plurality of receivers generating the detected signal having the highest relative signal strength when the detected signal from each of the receivers has a signal-to-noise ratio at the threshold.

2. The diversity reception system of claim 1 wherein each receiver comprises a signal strength indicator for generating a received strength signal indicative of the signal strength of the received radio frequency signal, and wherein said receiver selector includes a comparator for selecting one of said plurality of receivers based on the generated received strength signal.

3. The diversity reception system of claim 2 further comprising a plurality of diversity reception controllers, each diversity reception controller individually coupled to a signal strength indicator of one of the plurality of receivers for receiving the received strength signal and equalizing the received strength signal from the signal strength indicator in relation to equalized signals from other diversity reception controllers, each diversity reception controller outputting the equalized signal, the equalized signals coupled to the comparator of the receiver selector to select the receiver having the highest relative quality detected signal.

4. The diversity reception system of claim 3 wherein each diversity reception controller comprises an adjustable signal strength processor for tuning the received strength signal to output an equalized signal having a specified signal level corresponding to a selected input signal level.

5. The diversity reception system of claim 4 wherein each diversity reception controller further comprises a low pass filter for filtering high frequency components of received strength signals from the signal strength indicator.

6. The diversity reception system of claim 1 further comprising a detected signal input stage for each of the plurality of receivers and receiving the detected signal from a receiver to equalize the amplitude of the detected signals to compensate for variations in receiver output levels and for filtering DC bias from the detected signals.

7. The diversity reception system of claim 3 wherein each receiver selector comprises:
the comparator receives the equalized signals from the plurality of diversity reception controllers and determines the receiver having the highest relative detected signal quality according to the comparison, selecting the receiver generating the highest relative detected signal quality, and generating a receiver selection signal for indicating the selected receiver;
a signal strength selector responsive to the receiver selection signal and the equalized signals from the plurality of diversity reception controllers for selecting and outputting a selected equalized signal, the selected equalized signal defined as the equalized signal output from the diversity reception controller coupled to the selected receiver; and
a detected signal selector responsive to the receiver selection signal and the detected signals from the plurality of receivers for selecting and outputting a selected detected signal, from the selected receiver.

8. The diversity reception system of claim 1 wherein each receiver of the plurality of receivers further comprises a low noise amplifier for amplifying the received radio frequency signal.

9. The diversity reception system of claim 8 further comprising a gain reducing circuit for disabling the low noise amplifier in a receiver when an equalized signal from the receiver reaches a preselected threshold level.

10. The diversity reception system of claim 1 further comprising a plurality of antennas, each antenna individually coupled to one of the plurality of receivers for receiving a transmitted radio frequency signal.

11. The diversity reception system of claim 10 wherein each receiver further comprises a detector for detecting a received radio frequency signal.

12. The diversity reception system of claim 1 further comprising an output filter coupled to the receiver selector for filtering high speed transients induced by high-speed switching and for outputting a diversity reception audio output from the selected receiver.

13. The diversity reception system of claim 12 further comprising a frequency-shift keying data slicer coupled to said output filter and responsive to the diversity reception audio output for generating a diversity reception data output.

14. A diversity reception system for high quality signal reception, comprising:
a plurality of reception branches, each reception branch comprising:
an antenna for receiving a transmitted radio frequency signal;
a receiver individually coupled to the antenna for generating a detected signal from the received radio frequency signal, the receiver including a signal strength indicator for generating a received strength signal indicative of the signal strength of the received radio frequency signal;
a diversity reception controller coupled to the signal strength indicator of the receiver and receiving the received strength signal, the diversity reception controller equalizing the received strength signal in relation to equalized signals in the other reception branches of the diversity reception system, and outputting the equalized signal; and
a receiver selector coupled to the receiver and the diversity reception controller of each of the plurality of reception branches and outputting the detected signal of a selected receiver, said receiver selector including an audio selector for selecting the receiver from the plurality of receivers generating the detected signal having the highest relative signal-to-noise ratio when the detected signal from each of the receivers has a signal-to-noise ratio below a selected threshold signal-to-noise ratio corresponding to the maximum achievable signal-to-noise ratio, and for selecting the receiver from the plurality of receivers generating the detected signal having the highest relative signal strength when the detected signal from each of the receivers has a signal-to-noise ratio at the threshold.

15. The diversity reception system of claim 14 wherein the diversity reception controller in each of the plurality of reception branches further comprises:
a low pass filter for filtering high frequency components of the received strength signal; and
an adjustable signal strength processor for tuning the diversity reception controller to output an equalized signal having a specified signal level corresponding to a selected input signal level.

16. The diversity reception system of claim 14 wherein each reception branch further comprises a detected signal input stage for equalizing the amplitude of the detected signals to compensate for variations in receiver output levels and for filtering DC bias from the detected signals.

17. The diversity reception system of claim 14 wherein the receiver in each reception branch further comprises:

a low noise amplifier for amplifying a received radio frequency signal; and a detector coupled to the low noise amplifier for detecting a received radio frequency signal.

18. The diversity reception system of claim 17 further comprising a gain reducing circuit coupled to the receiver selector for disabling the low noise amplifier in the receiver in each reception branch when the equalized signal of the selected receiver reaches a preselected threshold level.

19. A method for improving radio frequency signal reception in a communication system having a plurality of receivers, comprising the steps of:

receiving a transmitted radio frequency signal at each of a plurality of receivers;

detecting the radio frequency signal received by each receiver to generate a detected signal for each receiver;

generating a plurality of equalized signals, each equalized signal corresponding to the detected signal for an individual receiver, wherein the generation of an equalized signal corresponding to an individual receiver comprises the steps of:

generating a received strength signal related to the strength of the radio frequency signal received by the receiver;

adjusting the amplitude of a received strength signal below a level required to produce a selected threshold signal-to-noise ratio corresponding to the maximum achievable signal-to-noise ratio to compensate for inaccuracies in the received strength signal and to provide correlation between the received strength signal and a signal-to-noise ratio of the detected signal; and calibrating the amplitude of the received strength signal to indicate the strength of the received signal with reference to a received strength signal above the level required to produce the preselected threshold signal-to-noise ratio;

comparing the equalized signals for each of the plurality of receivers; and selecting the active receiver having the highest amplitude among the plurality of equalized signals.

20. The method of claim 19 further comprising the steps of:

adjusting the amplitude of the detected signals to compensate for variations in receiver output levels; and filtering the detected signals to remove DC bias from the detected signals.

* * * * *